Patented Dec. 1, 1931

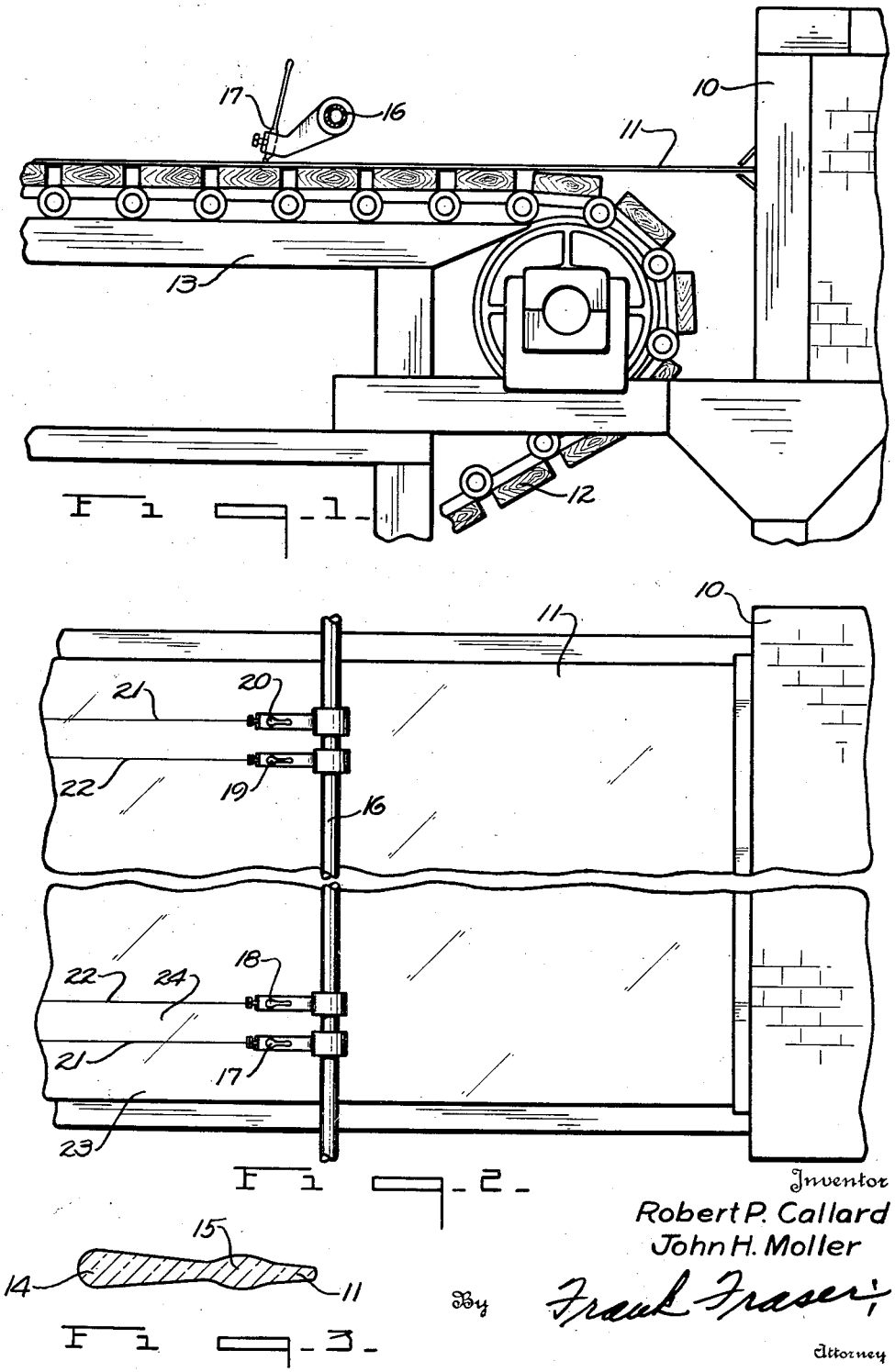

1,834,120

UNITED STATES PATENT OFFICE

ROBERT P. CALLARD AND JOHN H. MOLLER, OF CHARLESTON, WEST VIRGINIA, ASSIGNORS TO LIBBEY-OWENS-FORD GLASS COMPANY, OF TOLEDO, OHIO, A CORPORATION OF OHIO

METHOD FOR CUTTING SHEET GLASS

Application filed December 20, 1928. Serial No. 327,218.

The present invention relates broadly to the manufacture of sheet glass, and more particularly to an improved method for trimming or removing the longitudinal edges from the sheet as it issues from an annealing leer.

The primary object of the invention resides in the provision of a novel method of the character above stated whereby the longitudinal edges may be removed or trimmed from the glass sheet in such a manner that a clean cut will be had and the liability of the sheet edges being chipped or marred will be greatly reduced, if not entirely eliminated.

Other objects and advantages of the invention will become more apparent during the course of the following description when taken in connection with the accompanying drawings.

In the drawings forming a part of this application and wherein like numerals are employed to designate like parts throughout the same, Fig. 1 is a side elevation of one type of apparatus with which the present method may be practiced.

Fig. 2 is a plan view thereof, and

Fig. 3 is a detail section through one of the sheet edges.

The method herein provided is particularly well adapted, although not necessarily restricted, to use in the trimming or cutting of glass produced by the Colburn process wherein the glass sheet, in the form of a continuous ribbon, is initially drawn in a generally vertical direction from a mass of molten glass for a suitable distance, after which it is deflected into the horizontal plane and passed in a generally horizontal direction through an annealing leer. As the continuous sheet emerges from the leer, it is received upon a movable cutting table where it is cut transversely into sheet sections or lengths.

In the Colburn process, suitable width maintaining means are arranged to engage the sheet edges at the sheet source to prevent narrowing of said sheet as it is being drawn upwardly. These sheet edge engaging devices ordinarily form thickened or knurled edges on the sheet and which edges are removed therefrom either on the cutting table or some other place where the sheet is reduced to commercial sizes.

In the commercial operation of the Colburn process, it was customary, prior to the present invention, to arrange at the exit end of the leer cutting or scoring devices, one at each side of the sheet to trim off the knurled or thickened edge portions above referred to. Various thicknesses of sheets can be produced by the Colburn process depending upon the speed and temperature at which the sheet is drawn. It has been found in trimming the edges from the thicker sheets, namely the one-quarter inch and three-sixteenth inch thicknesses, for example, that when making a single cut at each edge of the sheet, a clean cut is not ordinarily obtained. The art has developed to a stage where a clean cut is practically demanded by the trade and it is an object of the present invention to provide an improved method whereby all thicknesses of sheets of glass can be trimmed in a manner that the resultant edges show a clean cut.

To this end, the sheet issuing from the annealing leer is adapted to be scored along two parallel lines adjacent each edge of the sheet so that a plurality of strips of glass are removed from each edge thereof. It has been found, in actual practice, that by scoring the sheet along two parallel lines adjacent each longitudinal edge thereof and then breaking the sheet first along the outer score line and then along the inner score line that the second break will leave a clean cut, while the first break will throw spawls and the like and act to chip or mar the edges of the sheet. This is apparently due to internal strains in the heavy thickened or knurled edges of the sheet which are formed during the drawing operation and which strains are not relieved during annealing but are relieved after the first cut has been completed to remove the thickened edge portion, so that when the sheet is broken along the second score line a clean severing of the sheet is had.

In the drawings, there is disclosed, by way of illustration, one type of apparatus by which the present method might be practiced although it is to be understood that various types of cutting apparatus might be used without departing from the spirit of the invention. The numeral 10 designates the exit end of a substantially horizontal annealing leer through which the continuous sheet 11 has been passed. As the sheet issues from the annealing leer, it is received upon the cutting table 12 which may comprise a plurality of wooden blocks or the like hingedly associated and adapted to run, in their upper horizontal flight, upon rails 13. The sheet 11 may, of course, be formed in accordance with any one of the several well known processes for producing sheet glass. However, during the formation or drawing of the sheet in according with the Colburn process, the edge engaging means or knurled rollers usually employed for holding the sheet to width form heavy or knurled edges 14 thereon and adjacent these edges are thickened strips of glass 15, as shown particularly in Fig. 3.

In accordance with the present invention, there is mounted transversely above the cutting table 12 a cross rod or member 16 carrying four cutters 17, 18, 19 and 20 of any desired construction. As is clearly shown, the four cutting members used are arranged in pairs, the pair 17, 18 being disposed adjacent one longitudinal edge of the sheet and the pair 19, 20 adjacent the opposite longitudinal edge thereof. These cutters are adapted to be stationary and as the sheet issues from the leer 11 and is carried upon the table 12 beneath said cutters, it will be apparent that the said sheet will be scored along two parallel lines adjacent each edge thereof. That is, the outer cutter of each pair is adapted to score the sheet along the line 21 inwardly of but adjacent to the respective thickened edge portion while the inner cutter of each pair is adapted to act substantially simultaneously upon the sheet to score the same along the line 22 which is inwardly of but parallel with the first or outer score. The sheet is then adapted to be broken first along each outer score line 21 and subsequently along each inner score line 22 so that two strips of glass 23 and 24 are removed from each edge of the sheet.

As brought out above, by scoring and breaking the sheet in this manner, a clean severing of the sheet can be obtained and the edges of said sheet will not be chipped or otherwise marred. This is caused by the fact that the internal strains, which are set up in the thickened, knurled edge portions will be relieved upon a breaking of the glass along the outer score lines with the result that the second break along the inner score lines will give a clean cut. This method has been and is now in commercial use and has proven very satisfactory, especially in the cutting of the thicker sheets of glass. While the trimming of the longitudinal edges from the sheet is accomplished preferably before the continuous sheet is cut transversely into sheet lengths, it will be apparent that the sheet might be cut transversely first if desired or, in other words, in advance of the longitudinal scoring. The edge portions of the sheet may, of course, take on different shapes when using different types of width maintaining devices but the method will be practiced in the same manner. Broadly stated, the present invention consists in trimming the edges from the sheet as it issues from the annealing leer by scoring the sheet a plurality of times adjacent each edge thereof, regardless of the manner in which the said sheet is formed or the type of width maintaining means used.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a method for the manufacture of sheet glass, the steps consisting in passing the sheet through an annealing leer, scoring the sheet, as it issues from said leer, along two parallel lines adjacent each longitudinal edge thereof, and in then breaking the sheet first along the outer score line and subsequently along the inner score line.

2. In a method for the manufacture of sheet glass, the steps consisting in passing a continuous ribbon of glass through an annealing leer, scoring the ribbon as it issues from said leer along two parallel lines adjacent each longitudinal edge thereof, breaking the sheet first along the outer score line and subsequently along the inner score line, and in then cutting the ribbon transversely into sheet lengths.

3. In a method for the manufacture of sheet glass, the steps consisting in passing a sheet formed with thickened edge portions through an annealing leer, scoring the sheet, as it issues from said leer, along each longitudinal edge thereof inwardly of but adjacent to the thickened portion, simultaneously making a second score inwardly of but parallel with the first score, breaking the sheet first along the outer score line to remove the thickened edge portion so as to relieve strains in the glass ribbon, and subsequently breaking the sheet along the inner score line.

4. In a method for the manufacture of sheet glass, the steps consisting in passing a continuous ribbon of glass formed with thickened edge portions through an annealing leer, scoring the ribbon, as it issues from said leer, along each longitudinal edge thereof inwardly of but adjacent to the thickened portion, simultaneously making a second score inwardly of but parallel with the first score, breaking the ribbon first along the outer score line to remove the thickened edge portion so as to relieve strains in the glass ribbon, subsequently breaking the ribbon along the inner score line, and in then cutting the ribbon transversely into sheet lengths.

5. In a method for the manufacture of sheet glass, the steps consisting in passing a continuous ribbon of glass formed with thickened edge portions through an annealing leer, scoring the ribbon as it issues from said leer along a plurality of spaced substantially parallel lines adjacent each edge of the sheet, and in breaking the glass successively along the score lines from the outermost score line to the innermost score line at each edge thereof, the first break serving to remove the thickened edge portion so as to relieve strains in the sheet and the final break resulting in a clean cut.

Signed at Charleston, in the county of Kanawha, and State of West Virginia, this 14th day of December, 1928.

ROBERT P. CALLARD.
JOHN H. MOLLER.